United States Patent
Schmidt

(10) Patent No.: US 10,649,125 B2
(45) Date of Patent: May 12, 2020

(54) LIGHTING DEVICE FOR OPTIMIZED LIGHT DISTRIBUTION

(71) Applicant: SMR Patents S.à.r.l., Luxembourg (LU)

(72) Inventor: Oliver Schmidt, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 68 days.

(21) Appl. No.: 15/748,569

(22) PCT Filed: May 24, 2016

(86) PCT No.: PCT/EP2016/061721
§ 371 (c)(1),
(2) Date: Jan. 29, 2018

(87) PCT Pub. No.: WO2017/016702
PCT Pub. Date: Feb. 2, 2017

(65) Prior Publication Data
US 2018/0203176 A1    Jul. 19, 2018

(30) Foreign Application Priority Data

Jul. 29, 2015   (DE) .................. 10 2015 112 438

(51) Int. Cl.
*F21S 43/245*    (2018.01)
*F21V 8/00*    (2006.01)
(Continued)

(52) U.S. Cl.
CPC ........... *G02B 6/0003* (2013.01); *B60Q 3/258* (2017.02); *F21S 43/13* (2018.01); *F21S 43/14* (2018.01);
(Continued)

(58) Field of Classification Search
CPC ........ G02B 6/0003; B60Q 3/258; B60Q 3/20; F21S 43/237; F21S 43/13; F21S 43/14;
(Continued)

(56) References Cited

U.S. PATENT DOCUMENTS

| | | |
|---|---|---|
| 5,709,453 A | 1/1998 | Krent et al. |
| 2005/0007645 A1* | 1/2005 | Tonar ............... B60Q 1/2665 359/265 |
| 2010/0157406 A1 | 6/2010 | Gruhlke et al. |
| 2012/0170303 A1 | 7/2012 | Meir |
| 2014/0063805 A1 | 3/2014 | Song et al. |

(Continued)

FOREIGN PATENT DOCUMENTS

| | | |
|---|---|---|
| DE | 10 2005 019093 | 10/2006 |
| EP | 2 450 726 | 5/2012 |

OTHER PUBLICATIONS

International Search Report dated Aug. 8, 2016 of International application No. PCT/EP2016/061721.
(Continued)

*Primary Examiner* — Bao Q Truong
(74) *Attorney, Agent, or Firm* — Jones Day

(57) ABSTRACT

A lighting device installed in a vehicle for optimized light distribution includes a substrate having quantum dots which are adapted to emit light, a reflecting layer which may be arranged on the bottom side of the substrate, and a transparent layer which may be arranged on the top side of the substrate.

8 Claims, 1 Drawing Sheet

(51) Int. Cl.
*F21S 43/14* (2018.01)
*F21S 43/237* (2018.01)
*B60Q 3/258* (2017.01)
*F21S 43/13* (2018.01)
*F21S 43/236* (2018.01)

(52) U.S. Cl.
CPC ........... *F21S 43/236* (2018.01); *F21S 43/237* (2018.01); *F21S 43/245* (2018.01)

(58) Field of Classification Search
CPC ...... F21S 43/245; F21S 43/236; F21S 43/235; F21S 43/16; F21V 9/30; F21V 9/40; F21V 2200/30; F21W 2102/00; F21W 2103/00; F21W 2103/25
See application file for complete search history.

(56) References Cited

U.S. PATENT DOCUMENTS

| | | |
|---|---|---|
| 2014/0293616 A1 | 10/2014 | Vab Bommel et al. |
| 2015/0098224 A1 | 4/2015 | Hong et al. |
| 2015/0198319 A1 | 7/2015 | Salter et al. |
| 2015/0268403 A1* | 9/2015 | Hashizume .......... G02B 6/0003 362/612 |
| 2016/0297356 A1* | 10/2016 | Dellock ............... B60Q 1/2665 |

OTHER PUBLICATIONS

Written Opinion dated Aug. 8, 2016 of International application No. PCT/EP2016/061721.
Examination Report dated Mar. 18, 2016 of German application No. DE102015112438.

* cited by examiner

LIGHTING DEVICE FOR OPTIMIZED LIGHT DISTRIBUTION

CROSS-REFERENCE TO RELATED APPLICATIONS

This application is a national stage entry of International Patent Application No. PCT/EP2016/061721, filed May 24, 2016, which claims the benefit of German Patent Application No. DE 10 2015 112 438.6, filed Jul. 29, 2015, the disclosures of each of which is incorporated herein by reference in its entirety for all purposes.

BACKGROUND

1. Field of the Invention

The following description relates to a lighting device for use in an automotive environment for generating a homogenous light distribution. The lighting device includes a substrate which includes quantum dots, and where the quantum dots are excitable by electronic or optical means.

2. Related Art

In modern day vehicle lighting devices are not only used for illuminating the street, or for illuminating the passenger cabin, but also in the exterior rear view mirrors. For example, lights are used for visually indicating a blind spot to the driver, or as additional direction indicators supplementing the direction indicators at the front and rear side of the vehicle. Also, in the automotive industry the visual appearance of lighting systems becomes ever more important.

The lighting devices that are used in rear view mirrors are commonly arranged in a manner so that they radiate light away from the mirror. The lighting devices that are, for example, used as additional directional indicators are usually installed in the mirrors such that the transparent light cover of the lighting device follows the shape of the exterior surface of the exterior rear view mirror. Most of the exterior rear view mirrors that are used today are not perfectly square boxes, but rather have non-planar, i.e. three dimensional geometries. Therefore, the lighting devices must also have a corresponding three dimensional geometry. The transparent light cover is usually arranged on a place on or in the mirror which faces the direction of travel. The International regulations require only a certain intensity to the rear in the angular region between 5° and 60° horizontally, and −15° to 15 vertically, where 0° is facing horizontally opposite to the direction of travel. Also, the cover might extend around the whole side of the exterior rear view mirror to achieve better illumination and visibility of the lighting devices, for example also from a position lateral to the vehicle actuator and/or the rear view mirror. U.S. Pat. No. 6,152,587 describes an exterior rear view mirror having auxiliary lighting devices installed.

United States Patent Application Publication No. 2012/0170303 describes an illumination apparatus including a substantially planar wave guide with a plurality of light sources embedded within the in-coupling region of the wave guide. A film with photoluminescent materials is disposed over the outcoupling region of the waveguide.

European Patent Application No. 2 450 726 A1 described a waveguide including a transparent polymer containing nanoparticles capable of emitting light coated with a second transparent polymer layer.

United States Patent Application Publication No. 2010/0157406 describes a lighting device for a display comprising a plurality of MEMS interferometric modulators irradiated by a plurality of quantum dots.

German Patent Application No. 10 2005 019 093 describes a lighting device for a vehicle with a multi segmented light guide element.

Most prior art lighting devices use LED technology or conventional light bulbs. However, these prior art lighting devices emit light in a rather non-uniform manner. Also, the lighting devices that are used in the prior art, such as OLEDs (organic LEDs), have limited luminance, brightness, and durability.

SUMMARY

In an aspect, a lighting device installed in a vehicle for optimized light distribution includes a substrate having quantum dots which are adapted to emit light. The substrate may be any transparent and/or translucent dielectric material such as for example Polymethyl Methacrylate, PMMA, or Polycarbonate. Also, silicone or germanium may be used as substrate material or the substrate may be a composite material having dielectric properties and which could be based on PMMA or Polycarbonate. The substrate may extend over a large area while one dimension can be just a few micrometers. The substrate may include quantum dots, also referred to as semiconductor nanocrystals. These semiconductor nanocrystals are material particles that have at least one dimension smaller than 100 nanometers. Quantum dots have the property that they start to emit light at specific wavelengths, i.e. colors when they are being energized. For example, quantum dots convert light to longer wavelengths and scatter it out in a homogenous manner. Therefore, quantum dots can be incorporated into the substrate. The dimension of the quantum dots can be chosen depending on the desired wavelength.

Since quantum dots are both photo-active and electro-active, these dots can be energized with light or electricity. There are different suitable processes how the quantum dots can be incorporated into the substrate. For example, quantum dots can be integrated by growing a semiconductor heterostructure in the substrate. The quantum dots may be alternatively or in addition further assembled to the substrate by phase separation and/or contact printing.

In the substrate, the quantum dots may be densely packed and essentially uniform in size and shape so that a homogenous light distribution can be achieved. Moreover, the substrate may contain quantum dots only at certain positions in order to generate a customized luminance pattern. In addition, a change of size and/or shape and/or density of the quantum dots can be used to generate a light output varying in color and/or brightness.

The substrate may have a shape that is essentially non-planar. Here, the term "non-planar" is used to refer to any shape in which the substrate material is not being disposed in one spatial plane. Advantageously, the substrate can be shaped to correspond to the geometry of the component on which it will be arranged. For example, the substrate may be curved so that the geometry of the substrate corresponds to the curvature of that part of the rear view mirror on which it will be arranged.

The substrate may be a flexible substrate. Here, the term "flexible" is used to refer to a substrate that is bendable under the influence of an external force, i.e. the shape of the substrate can be altered under the influence of the external force without destroying and/or negatively influencing the integrity of the substrate. Since silicone is usually bridle, strained silicone which has larger spaces between its atoms may be used as substrate. This allows adjusting the shape of the substrate during mounting the lighting device to the external side mirror without doing any damage to the substrate.

The lighting device may include a light source that is adapted to excite the quantum dots that are within the substrate. The light source may be arranged anywhere at the substrate in such a manner that light from the light source can propagate directly into the substrate to excite the quantum dots within the substrate. For example, the light of the light source may propagate in a waveguide-like structure inside the substrate, or the light may simply illuminate the surface of the substrate where the surface is not covered with the reflective layer. The light from the light source excites the quantum dots which in turn start to radiate light from the surfaces that are not covered by the reflecting layer. The quantum dots radiate light for as long as the light source is switched on. By absorbing and emitting light in the above described manner, the quantum dots can be used for converting the wavelength of the exciting light. For example, the quantum dots may absorb blue light or UV light from a blue LED or from a UV LED, respectively, but may emit orange light themselves. For example, the light source may be a LED lamp arranged somewhere at the substrate.

The substrate may be included with the light source and/or arranged in a housing of the light source. Here, the term "housing" refers to the protective enclosure or casing of the light source that may include transparent and/or translucent material and which is designed to protect the actual light source from adverse outside influences such as mechanical influences. The substrate may be arranged anywhere within the housing, e.g. within the inside perimeter of the housing and/or within the housing material itself. For example, in case the light source is an LED lamp then the substrate may be arranged within the casing of the LED, and/or on the lens of the LED and/or inside the material that is used for the lens and/or the casing.

The light source may be part of the substrate including the quantum dots. Here, the light source may be an LED lamp arranged on the same substrate that also includes the quantum dots. For example, this can be done by integrating the LED lamp in the substrate material. Accordingly, the dimensions of the lighting device can be greatly reduced.

The lighting device includes a power source that is adapted to excite the quantum dots that are included within the substrate. The power source may be a conventional voltage supply that is adapted to apply a voltage between the reflecting layer and the transparent layer. The supply voltage may range from one volt up to several hundreds of volts. For example, the voltage may be in the region of 1 to 20 volts or 1 to 50 volts.

The lighting device may further include a reflecting layer arranged on or attached to the bottom side of the substrate; and/or a transparent layer arranged on or attached to the top side of the substrate. Here, the term "bottom side" refers to the side of the substrate that faces the component to which the reflecting layer is attached to, such as the casing of an exterior rear view mirror. The reflective layer may be, for example, a thin metalized foil that is attached to the bottom side of the substrate. Due to the presence of the reflective layer, the light loss of the lighting device can be greatly reduced.

The transparent layer may be attached opposite the reflective layer on the "top side" of the substrate. Here, the term "top side" refers to the side of the substrate that points towards the environment, or refers to the side that points away from the component on or in which it is installed. For example, the transparent layer may include a thin layer of plastic material which is attached to the substrate. For example, the transparent layer may be attached to the substrate by means of an adhesive, or by some other appropriate means. The transparent layer may cover the substrate and allows the light beams which originate from the quantum dots to propagate therethrough.

The reflecting layer and/or the transparent layer may have electroconductive properties, i.e. they may be conductive. For example, the reflecting layer and the transparent layer may include a conductive plastic material so that these layers can conduct electricity from the power source to the substrate. In order to achieve a difference in charge between the two sides of the substrate, the two conducting layers may be insulated from each other. For example, this may be done by adding a barrier layer of non-conductive material, e.g. non-conductive plastic material between the two conductive layers. In another example, a spatial gap may be left between the two conductive layers to insulate the two conductive layers from each other.

In another aspect, a rear view mirror includes a lighting device according to the examples described above.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention

DETAILED DESCRIPTION

Figure 1:
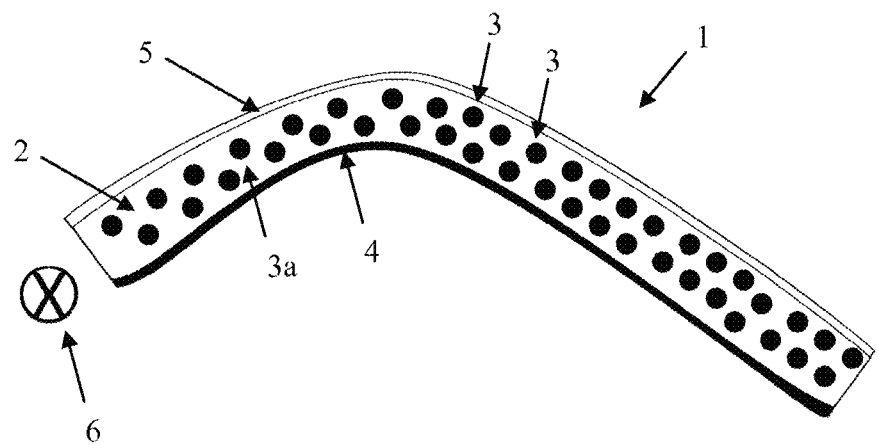
FIG. 1 is a diagram illustrating a schematic cross sectional view of a lighting device according to a first example where quantum dots included within the substrate are excitable by means of a light source.

The lighting device 1 according to a first example and illustrated in FIG. 1 includes a substrate 2 which includes quantum dots 3. In FIG. 1 quantum dot 3a are exemplarily and shown to account for all quantum dots 3 in the substrate 2. In the example that is shown in FIG. 1, the substrate 2 is bent to correspond to the surface of the component to which the lighting device 1 will be attached to. However, the substrate 2 may also be planar, i.e. the substrate 2 may be flat so that it would extend substantially in just two dimensions while having a height of only a few micrometers itself. On the bottom side of the substrate 2, a reflective layer 4 is arranged to reflect the light originating from the quantum dots 3 towards the top side of the substrate 2. To the latter side, a transparent layer 5 is attached which allows the light to pass through. However, the two layers 4, 5 are not necessarily required for the proper functioning of the lighting device 1. Also, t the reflecting layer 4 could be arranged on the top side and the transparent layer 5 could be arranged on the bottom side, respectively. This is because the quantum dots 3 which are embedded in the substrate 2 will emit light in all directions once they get excited. In this example, the quantum dots 3 may be excited by means of a light source 6 that is located at a location close to the substrate 2. In another example, the light source 6 may also be located on and/or within the substrate 2 (not shown).

Figure 2:
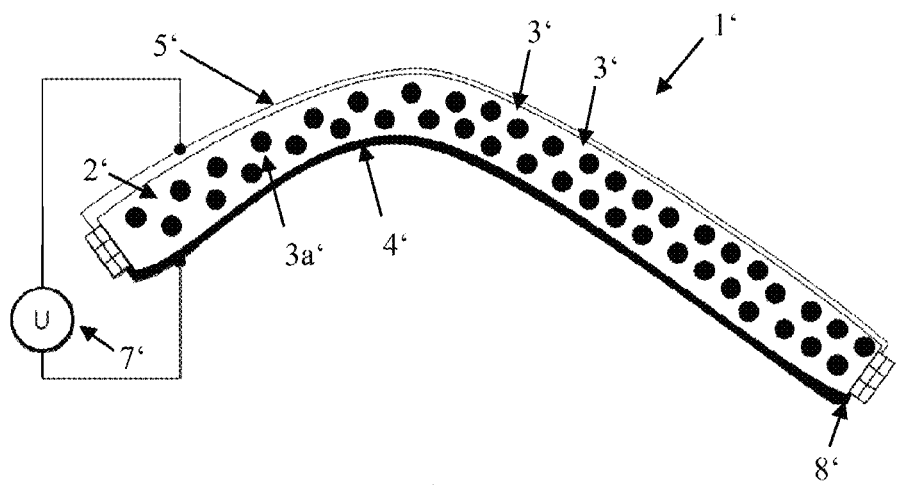
FIG. 2 is a diagram illustrating a schematic cross sectional view of a lighting device according to a second example where quantum dots included within the substrate are excitable by means of a power source.

FIG. 2 is a diagram illustrating a schematic cross sectional view of a lighting device 1' according to a second example. Elements of the lighting device 1' correspond to elements of the lighting device 1, hence the same reference number is used, however having one apostrophe. The quantum dots 3' which are included in the substrate 2' may be excitable by means of a power source 7' such as an electric power source. In this example, both the reflecting layer 4' and the transparent layer 5' may include conductive material so that a voltage can be applied across the substrate 2' by connecting the two layers 4', 5' to the power source 7' as shown in FIG. 2. Since both layers 4', 5' are attached to the surface of the substrate 4', the voltage can be applied equally over the entire surface of the substrate 2'. A barrier layer of non-conductive material 8' may be used to separate the two layers 4', 5' from each other.

Alternative ways for connecting the power source 7' to the substrate 2' may be used. For example, appropriate electroconductive structures could be embedded in the substrate 2'. In the this case, layers 4', 5' would not need to possess any electroconductive properties. Thus, layers 4', 5' would not be required for the functioning of the lighting device 1' at all.

Figure 3:
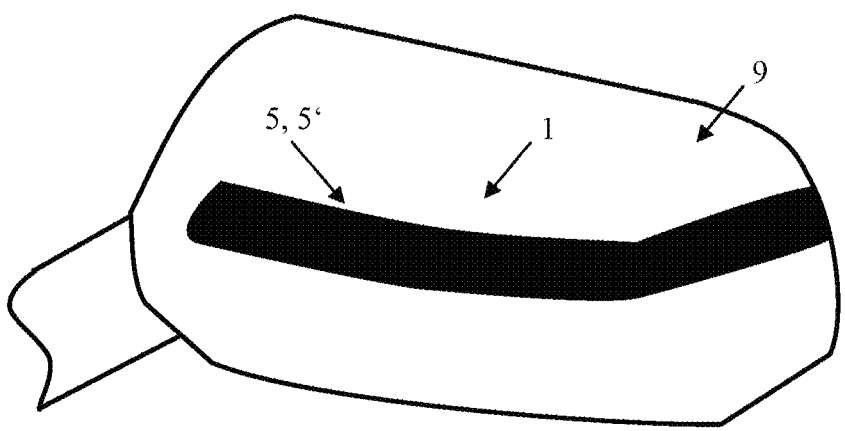
FIG. 3 is a diagram illustrating a view of a lighting device which is installed in a rear view mirror of a vehicle.

FIG. 3 illustrates a lighting device 1 which is installed in a rear view mirror 9 of a vehicle. Also, lighting device 1' may be installed in the rear view mirror 9. In this example, the lighting device 1, 1' is used as an auxiliary direction indicator which is located in the rear view mirror 9 of the vehicle. As illustrated in the figure, the lighting device 1, 1' has a three dimensional shape that corresponds to the shape of the rear view mirror 9.

The features disclosed in the claims, the specification, and the drawings may be essential for different embodiments of the claimed invention, both separately or in any combination with each other.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

1, 1' lighting device
2, 2' substrate
3, 3' quantum dots
3a, 3a' quantum dot
4, 4' reflecting layer
5, 5' transparent layer
6 light source
7' power source
8' non-conductive material
9 rear view mirror

What is claimed is:

1. A lighting device for use in an automotive environment and configured to be installed in a vehicle for optimized light distribution, the lighting device comprising:
    a substrate comprising quantum dots which are adapted to emit light, essentially uniform in size and shape, and comprise semiconductor nanocrystals having at least one dimension smaller than 100 nanometers;
    a reflecting layer arranged on a bottom side of the substrate; and
    a transparent layer arranged on a top side of the substrate, wherein
    at least one of the reflecting layer and/or the transparent layer has electroconductive properties.

2. The lighting device of claim 1, wherein the substrate comprises a substantially non-planar shape.

3. The lighting device of claim 1, wherein the substrate is flexible.

4. The lighting device of claim 1, further comprising a light source that is adapted to excite the quantum dots of the substrate.

5. The lighting device of claim 4, wherein the substrate is at least one of
    part of the light source, and
    arranged in a housing of the light source.

6. The lighting device of claim 4, wherein the light source is part of the substrate comprising the quantum dots.

7. The lighting device of claim 1, further comprising a power source that is adapted to excite the quantum dots of the substrate.

8. A rear view mirror for a vehicle comprising the lighting device of claim 1.

* * * * *